United States Patent [19]

Yabe

[11] Patent Number: 5,323,872

[45] Date of Patent: Jun. 28, 1994

[54] AUTOMOTIVE VEHICLE EQUIPPED WITH AIR BAG SYSTEM

[75] Inventor: Takayuki Yabe, Yamato, Japan

[73] Assignee: NSK Ltd., Tokyo, Japan

[21] Appl. No.: 790,440

[22] Filed: Nov. 12, 1991

[30] Foreign Application Priority Data

Nov. 15, 1990 [JP] Japan ................. 2-118812

[51] Int. Cl.⁵ .................... F01N 1/16; B60R 21/32
[52] U.S. Cl. .................... 180/271; 180/274; 280/735; 454/75
[58] Field of Search .......... 280/728, 738, 740, 739, 280/735, 728 A, 728 R, 728 B; 180/271, 274, 282, 281; 454/75, 143

[56] References Cited

U.S. PATENT DOCUMENTS

| | | | |
|---|---|---|---|
| 3,418,914 | 12/1968 | Finkin | 454/75 |
| 3,694,003 | 9/1972 | Radke | 280/150 |
| 3,738,681 | 6/1973 | Wada et al. | 280/150 |
| 3,741,583 | 6/1973 | Usui et al. | 280/150 |
| 3,747,953 | 7/1973 | Goes et al. | 454/75 |
| 4,747,953 | 5/1988 | Holter et al. | 454/75 |
| 5,246,083 | 12/1993 | Graf et al. | 180/271 |

FOREIGN PATENT DOCUMENTS

| | | | |
|---|---|---|---|
| 48-18913 | 3/1973 | Japan . | |
| 288341 | 3/1990 | Japan . | |
| 0246137 | 11/1991 | Japan | 280/728 |
| 9100812 | 1/1991 | World Int. Prop. O. . | |

*Primary Examiner*—Margaret A. Focarino
*Assistant Examiner*—Paul Dickson
*Attorney, Agent, or Firm*—Wegner, Cantor, Mueller & Player

[57] ABSTRACT

An automotive vehicle equipped with an air bag system includes an interior gas discharge device for communicating a vehicle interior to the outside upon detection of a vehicular collision and a forced ventilation device provided for operation upon detection of the vehicular collision.

14 Claims, 1 Drawing Sheet

AUTOMOTIVE VEHICLE EQUIPPED WITH AIR BAG SYSTEM

BACKGROUND OF THE INVENTION

1) Field of the Invention

This invention relates to an improvement in an automotive vehicle equipped with an air bag system, and especially to the discharge of a gas, which has been generated upon actuation of the air bag system, from a vehicle interior into the outside.

2) Description of the Related Art

As a cushioning system for providing additional safety beyond that provided by a seat belt system for holding safely an occupant or the like of an automotive vehicle, an air bag system has been put into practical use. With the air bag system, the body of an occupant, especially his head and chest, is supported by a balloon-like air bag in the event of a collision and the internal gas is then gradually discharged, whereby a cushioning stroke is prolonged to reduce impact to the body.

Such an air bag system includes a module constructed of a center pad, a folded air bag, an inflator (gas generator) and the like. The module can be built into a steering wheel, for example. When triggered by an electric signal from a sensor which has detected a vehicular collision, the inflator is activated so that the air bag is instantaneously inflated by the resulting gas. After the air bag so inflated has supported as a cushioning member the head and chest of the occupant in the event of a collision, the gas is gradually released through a gas release hole formed in the air bag. As a result, impact to the occupant is reduced.

Such air bag systems include not only an air bag system for a driver's seat as described above but also an air bag system for a front passenger's seat or a rear passenger's seat. The air bag of the latter system has a greater volume than that of the former system. When all the air bag systems are actuated, the total volume of gas and smoke generated by inflators of the respective air bag systems becomes substantial.

Incidentally, gas and smoke produced from a detonator of each inflator to inflate its associated air bag contain components which give discomfort to passengers. Especially when the ventilation of an automotive vehicle is in a naturally-ventilated state (i.e., in a state not forcedly ventilated with the exterior air), an opening through which the vehicle interior is in communication with the exterior air is extremely small so that the gas filled in the vehicle interior can be hardly discharged into the outside of the automotive vehicle. This leads to the problem that the gas and smoke released from the air bags remain at high concentrations inside the vehicle interior.

SUMMARY OF THE INVENTION

An object of the present invention is to overcome the problem described above, and specifically to provide an automotive vehicle improved such that gas and smoke—which have been generated from a detonator of an inflator as a result of actuation of an air bag system—can be promptly discharged from the vehicle interior into the outside to lower the concentrations of the gas and smoke remaining inside the vehicle interior and the occupant can therefore be kept free from discomfort.

In one aspect of the present invention, there is thus provided an automotive vehicle equipped with an air bag system, which comprises:

a collision sensor means for detecting a vehicular collision;

an air bag provided for inflation upon detection of a collision by the collision sensor means, whereby a passenger is protected from impact;

an interior gas discharge means for communicating a vehicle interior to the outside upon detection of the collision by the collision sensor means; and a forced ventilation means provided for operation upon detection of the collision by the collision sensor means, whereby the vehicle interior is ventilated.

Examples of the interior gas discharge means include a means for opening a power window, a power sunroof or the like responsive to impact of at least a predetermined level or based on a signal from a collision sensor; and a means for normally biasing a window glass pane, a sunroof or like in an opening direction and holding it by a lock mechanism which is released responsive to impact of at least a predetermined level or based on a signal from a collision sensor.

The forced ventilation means may be, for example, a means for actuating an interior air circulation/ventilation blower or an exclusive blower, which is assembled in the vehicle, responsive to impact of at least a predetermined level or based on a signal from a collision sensor.

According to the present invention, the interior of the automotive vehicle is communicated to the outside in the event of a vehicular collision and, at the same time, the forced ventilation means is operated to ventilate the vehicle interior, whereby forced ventilation of the vehicle interior is automatically performed. The gas and smoke released from the air bag into the vehicle interior can therefore be released promptly and efficiently into the outside of the vehicle.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENT

Figure 1:
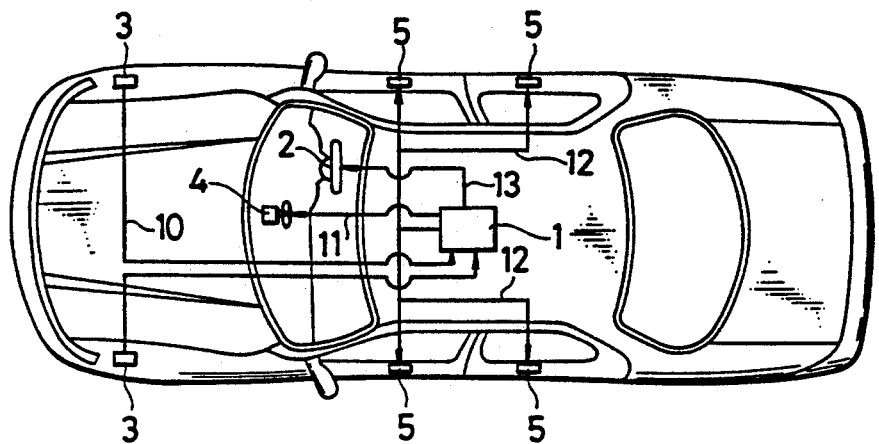
FIG. 1 is a simplified top plan view of an automotive vehicle according to one embodiment of the present invention, showing various signal transmission lines.

Referring first to FIG. 1, the automotive vehicle according to the embodiment of the present invention is provided with an air bag system, which comprises collision sensors 3 for detecting a vehicular collision, a controller 1 and an air bag module 2. The automotive vehicle also has an air conditioner and power windows.

The collision sensors 3 detect, for example, an inertia of the vehicle body upon a vehicular collision and send a detection signal 10 to the controller 1. A collision sensor means is composed of the controller 1 and at least one of the collision sensors 3. Upon receipt of an actuating signal 13 from the controller 1, the air bag module 2 ignites an inflator to instantaneously inflate an air bag.

The air conditioner has a fan 4 which, as a blower, feeds air-conditioned air through an air flowing-out opening, i.e., a vent into a vehicle interior. By the actuating signal from the controller 1, the fan 4 can also be operated as a forced ventilation means. Further, drive motors 5 are also provided for the power windows, respectively. Each drive motor 5 can be operated by its corresponding passenger's personal switch to open or close an associated window glass pane 6. These drive motors 5 are also operated as an interior gas discharge means by the actuating signal 12.

Figure 2:
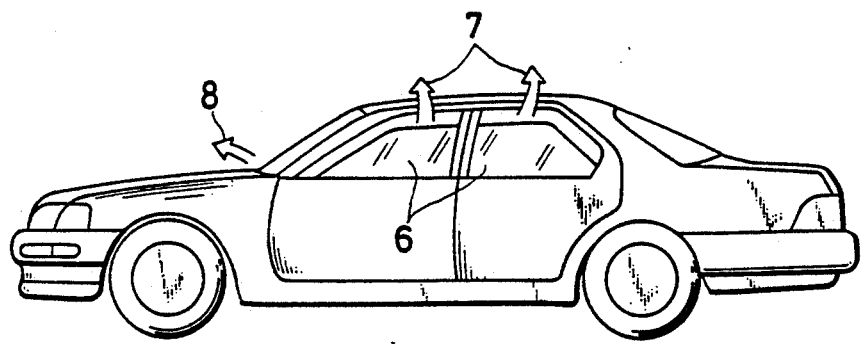
FIG. 2 is a side view of the automotive vehicle shortly after actuation of an air bag thereof.
Figure 3:
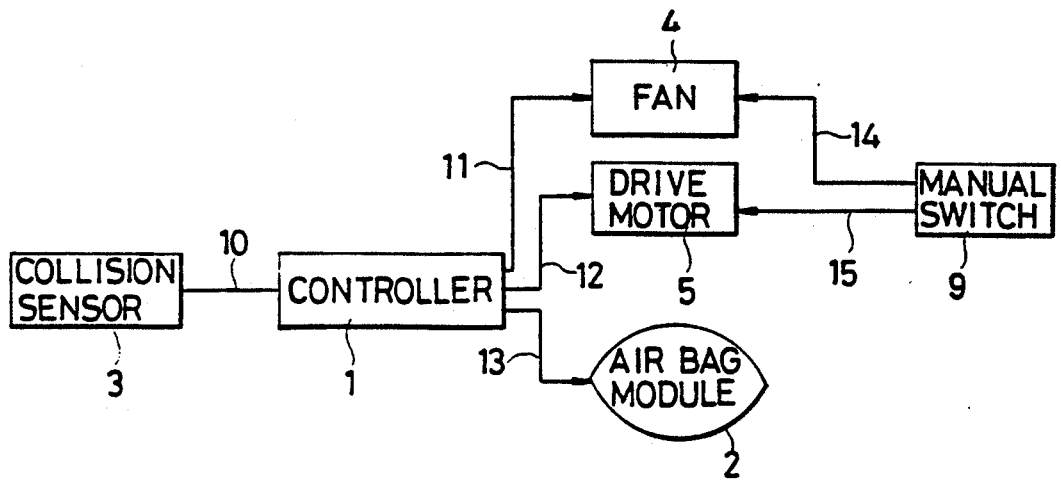
FIG. 3 is a block diagram of a gas/smoke discharge system of the automotive vehicle.

Operation of the above-described gas/smoke discharge system will next be described with reference to FIGS. 2 and 3.

Firstly, when the vehicle body is suddenly decelerated in the event of a vehicular collision, the collision sensors 3 detect an inertia of the vehicle body and send the detection signal 10 to the controller 1. The detection signal 10 is then analyzed by the controller 1. Where a vehicular collision is diagnosed as a result, the controller 1 feeds the actuation signal 13 to the air bag module 2 and, at the same time, the actuating signals 11,12 to the fan 4 of the air conditioner and to the drive motors 5 of the power windows, respectively.

Upon receipt of the actuating signal 13, the air bag module 2 ignites the inflator so that the air bag is inflated. On the other hand, upon delivery of the actuating signal 11, the fan 4 of the air conditioner is operated to provide a maximum flow rate irrespective of the operation condition of the air conditioner. Further, upon input of the actuating signal 12, the drive motor 5 of each power window drives the corresponding window glass pane 6 in an opening direction so that the window is opened. Incidentally, the fan 4 and the drive motors 5 are normally operated by actuating signals 14,15, respectively. These actuating signals 14,15 are each inputted through a manual switch 9.

By the air blown out from the fan 4, the air of the vehicle interior is thus forced out through the opened windows as indicated by arrows 7, so that the vehicle interior is forcedly ventilated. By providing a large opening communicating with the outside and feeding air into the vehicle interior with the fan as a forced ventilation means as described above, the vehicle interior can be efficiently and promptly ventilated.

The gas and smoke, which have been released from the air bag after the actuation of the air bag system, can therefore be promptly discharged into the outside.

In the embodiment described above, the power windows were used as the interior gas discharge means. Alternatively, the vehicle interior can also be communicated to the outside, for example, by providing a means for opening a power sunroof in a similar manner or enlarging an air inlet or outlet of the vehicle interior or by providing a means for breaking a window glass pane. As a further alternative, it is also possible to provide a biasing member such as a spring to normally bias a window glass pane, a sunroof or the like in an opening direction. However, the window glass pane, sunroof or the like is normally held in a closed state by means of a lock mechanism. The lock mechanism is released responsive to impact of at least a predetermined level or based on a signal from a collision sensor so that the window glass pane, the sunroof or the like is opened by the force of the biasing element.

It is also possible to reverse the rotation of the fan 4 by the actuating signal 11 from the controller 1 so that the air of the vehicle interior can be discharged through an air inlet of the air conditioner as indicated by arrow 8. As a still further alternative, an exclusive fan can be provided in addition to the fan 4 of the air conditioner and, by an actuating signal from the controller, the exclusive fan can be operated to ventilate the vehicle interior.

Where the air bag system is actuated by a mechanical sensor built in the air bag module 2, it is also possible to provide the vehicle body with an exclusive collision sensor and to have the interior gas discharge means and the forced ventilation means actuated by a signal from the collision sensor.

I claim:

1. An automotive vehicle equipped with an air bag system, comprising:
   a collision sensor means for detecting a vehicular collision;
   an air bag provided for inflation upon detection of a collision by the collision sensor means, whereby a passenger is protected from impact;
   an interior gas discharge means for communicating a vehicle interior to the outside upon detection of the collision by the collision sensor means; and
   a forced ventilation means provided for operation upon detection of the collision by the collision sensor means, whereby the vehicle interior is ventilated.

2. The automotive vehicle of claim 1, wherein said collision sensor means comprises a collision sensor and a controller for analyzing a detection signal from the collision sensor and, upon analysis of a vehicular collision, outputting an actuating signal.

3. The automotive vehicle of claim 2, wherein the air bag is inflated upon receipt of the actuating signal from the controller.

4. The automotive vehicle of claim 2, wherein said interior gas discharge means is actuated upon receipt of the actuating signal from the controller.

5. The automotive vehicle of claim 4, wherein said interior gas discharge means comprises a drive motor for driving a power window in an opening direction upon receipt of the actuating signal.

6. The automotive vehicle of claim 4, wherein said interior gas discharge means comprises a means for opening a power sunroof upon receipt of the actuating signal.

7. The automotive vehicle of claim 4, wherein said interior gas discharge means comprises a means for enlarging an air inlet or outlet of the vehicle interior upon receipt of the actuating signal.

8. The automotive vehicle of claim 4, wherein said interior gas discharge means comprises a means for breaking a window glass pane upon receipt of the actuating signal.

9. The automotive vehicle of claim 4, wherein said interior gas discharge means comprises a means for normally biasing a window glass pane or a sunroof in an opening direction and a lock mechanism for normally holding the window glass pane or sunroof in a closed state against the force of the biasing means but releasing the closed state upon receipt of the actuating signal.

10. The automotive vehicle of claim 2, wherein said forced ventilation means is operated upon receipt of the actuating signal from the controller.

11. The automotive vehicle of claim 10, wherein said forced ventilation means comprises an air conditioner blower capable of providing a maximum airflow rate upon receipt of the actuating signal.

12. The automotive vehicle of claim 10, wherein said forced ventilation means comprises an air conditioner blower whose rotation is reversed upon receipt of the actuating signal.

13. The automotive vehicle of claim 10, wherein said forced ventilation means comprises a blower provided for operation upon receipt of the actuating signal.

14. The automotive vehicle of claim 1, wherein said collision sensor means comprises a first collision sensor for inflating the air bag and a second collision sensor for operating said interior gas discharge means or said forced ventilation means, and the first and second collision sensors actuate independently from each other.

* * * * *